(12) United States Patent
Grenier

(10) Patent No.: US 7,816,800 B2
(45) Date of Patent: Oct. 19, 2010

(54) ELECTRIC GENERATION SYSTEM INCLUDING MULTIPLE MOTOR/GENERATORS

(75) Inventor: Albert J. Grenier, Ramona, CA (US)

(73) Assignee: Baseload Energy, Inc., Portland, OR (US)

( * ) Notice: Subject to any disclaimer, the term of this patent is extended or adjusted under 35 U.S.C. 154(b) by 0 days.

(21) Appl. No.: 12/702,686

(22) Filed: Feb. 9, 2010

(65) Prior Publication Data

US 2010/0156102 A1 Jun. 24, 2010

Related U.S. Application Data

(62) Division of application No. 12/175,416, filed on Jul. 17, 2008, now Pat. No. 7,675,189.

(60) Provisional application No. 60/950,149, filed on Jul. 17, 2007.

(51) Int. Cl.
*F03D 9/00* (2006.01)
*F01D 5/14* (2006.01)
(52) U.S. Cl. .............................. 290/54; 290/43; 415/4.3
(58) Field of Classification Search .................. 290/43, 290/44, 54, 55; 415/4.3, 4.5
See application file for complete search history.

(56) References Cited

U.S. PATENT DOCUMENTS 4,166,596 A * 9/1979 Mouton et al. ................ 244/30
4,285,481 A * 8/1981 Biscomb ....................... 244/33
4,450,364 A * 5/1984 Benoit .......................... 290/55
6,064,123 A * 5/2000 Gislason ....................... 290/55
6,781,254 B2 * 8/2004 Roberts ........................ 290/55
6,951,443 B1 * 10/2005 Blakemore .................. 415/4.3
7,109,598 B2 * 9/2006 Roberts et al. ............... 290/44
7,129,596 B2 * 10/2006 Macedo ........................ 290/55
7,335,000 B2 * 2/2008 Ferguson ....................... 417/7
7,675,189 B2 * 3/2010 Grenier ........................ 290/54

* cited by examiner

*Primary Examiner*—Nicholas Ponomarenko
(74) *Attorney, Agent, or Firm*—Dicke, Billig & Czaja, PLLC

(57) ABSTRACT

An electric generating system including a frame configured to couple to a tether system and at least one power generation module mounted to the frame. The at least one power generation module includes a holding structure attached to the frame, a rotating structure, including a rotor shaft, configured to rotate relative to the holding structure, a rotor attached to the rotor shaft, and a plurality of motor/generators attached to the holding structure, each including a drive shaft configured to engage with the rotor shaft. The electric generating system is configured to operate in a first mode wherein the motor/generators are configured to receive electrical energy from the tether system and drive the drive shafts to create a torque on the rotor shaft to thereby rotate the rotor and create lift to fly the electric generating system to an operating position within an air stream, and to operate in a second mode wherein the rotor is configured to be rotated by the air stream to provide lift to maintain the electric generating system within the air stream and to create a torque on the rotor shaft to thereby rotate the rotor shaft and the rotating structure so that the torque from the rotor is transmitted to the motor/generators via the drive shafts to generate electrical energy which is provided to the tether system.

20 Claims, 14 Drawing Sheets

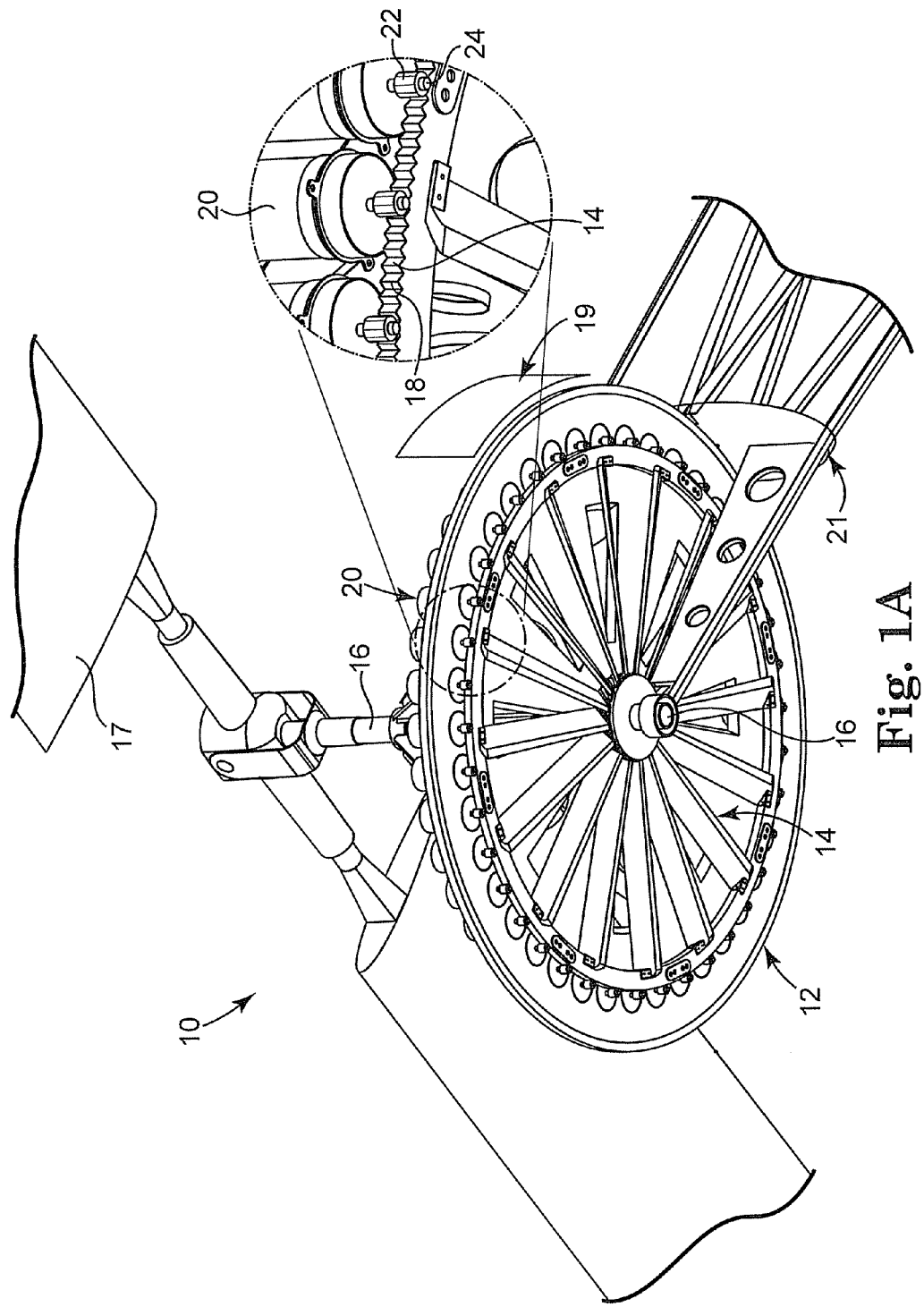

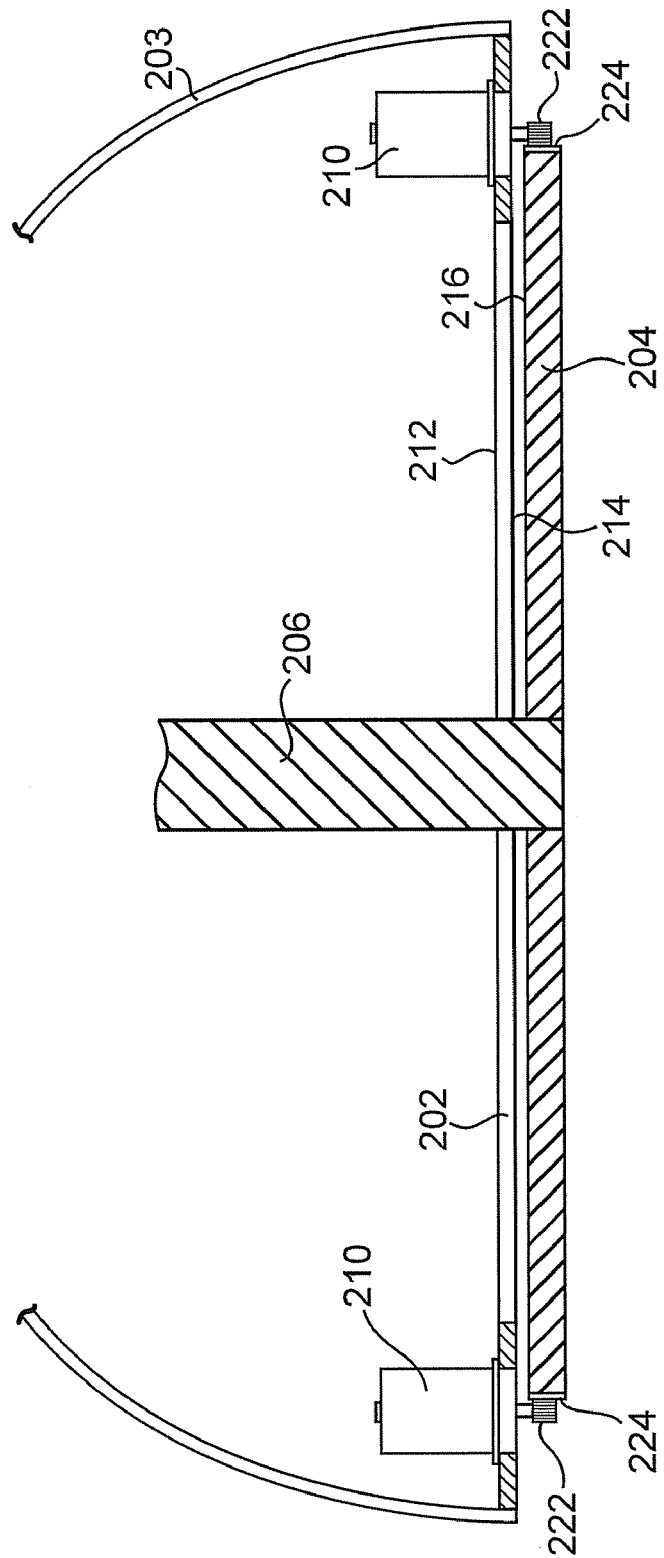

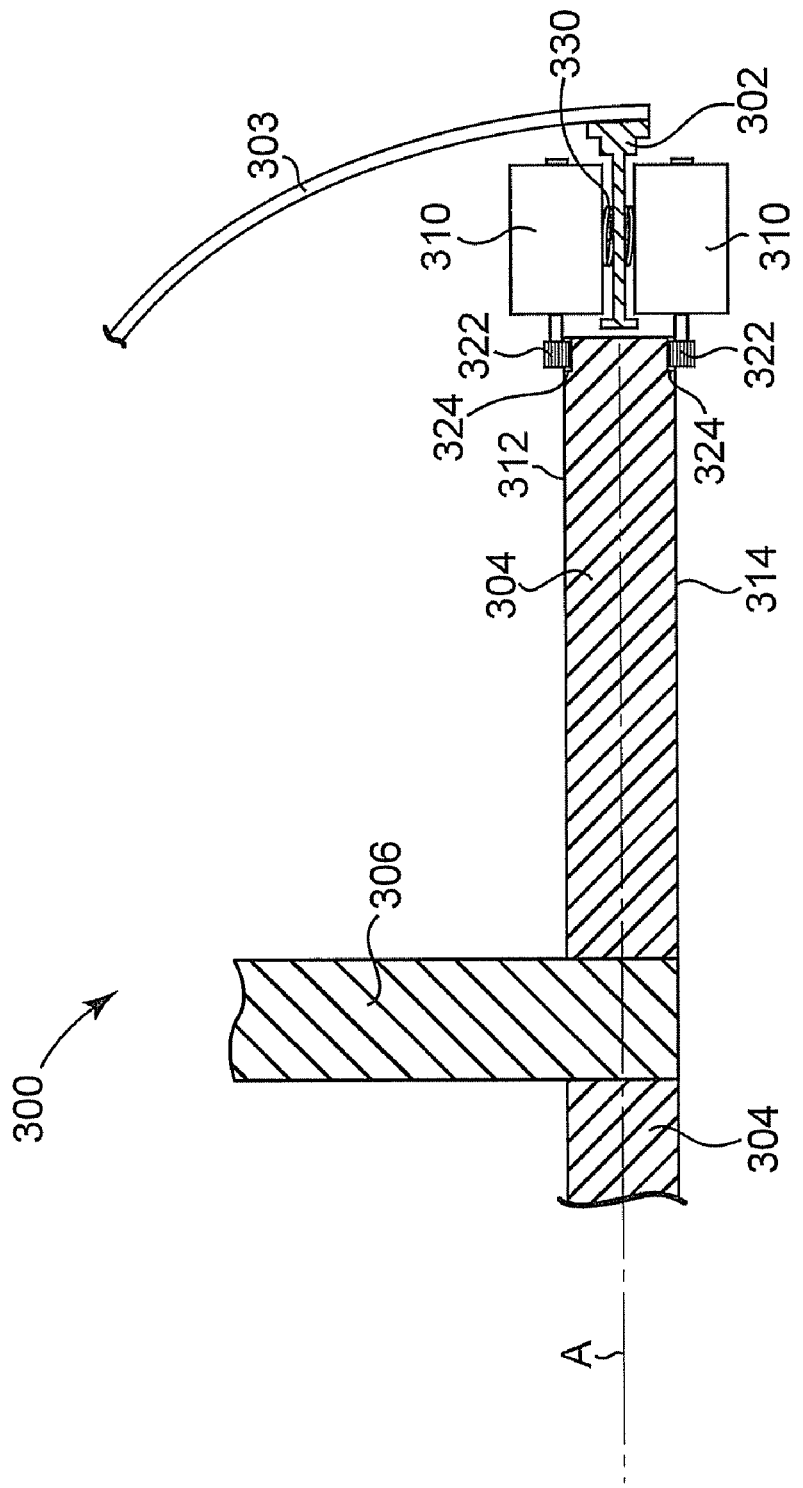

ELECTRIC GENERATION SYSTEM INCLUDING MULTIPLE MOTOR/GENERATORS

CROSS-REFERENCE TO RELATED APPLICATION

This patent application is a Divisional of co-pending U.S. application Ser. No. 12/175,416 filed Jul. 17, 2008, entitled "POWER GENERATION SYSTEM INCLUDING MULTIPLE MOTORS/GENERATORS" which claims the benefit of the filing date of U.S. Provisional Patent Application Ser. No. 60/950,149 filed Jul. 17, 2007, entitled "POWER GENERATION SYSTEM INCLUDING MULTIPLE MOTORS/GENERATORS."

BACKGROUND

Fossil fuels are the primary source of energy for the planet. The rate of fossil fuel consumption is likely outpace the rate of fossil fuel production as the planet's population continues to grow and as less economically developed countries become industrialized. This expected increase in demand for fossil fuels could exhaust the global supplies of fossil fuels within the next several decades if consumption continues at the present rate.

It is desirable to harness energy from renewable sources such as solar power, wind power, hydro power, and/or geothermal power to minimize dependence on fossil fuels.

SUMMARY

One embodiment provides an electric generating system including a frame configured to couple to a tether system and at least one power generation module mounted to the frame. The at least one power generation module includes a holding structure attached to the frame, a rotating structure, including a rotor shaft, configured to rotate relative to the holding structure, a rotor attached to the rotor shaft, and a plurality of motor/generators attached to the holding structure, each including a drive shaft configured to engage with the rotor shaft. The electric generating system is configured to operate in a first mode wherein the motor/generators are configured to receive electrical energy from the tether system and drive the drive shafts to create a torque on the rotor shaft to thereby rotate the rotor and create lift to fly the electric generating system to an operating position within an air stream, and to operate in a second mode wherein the rotor is configured to be rotated by the air stream to provide lift to maintain the electric generating system within the air stream and to create a torque on the rotor shaft to thereby rotate the rotor shaft and the rotating structure so that the torque from the rotor is transmitted to the motor/generators via the drive shafts to generate electrical energy which is provided to the tether system.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many intended advantages of embodiments will be readily appreciated as they become better understood by reference to the following detailed description. The elements of the drawings are not necessarily to scale relative to each other. Like reference numerals designate corresponding similar parts.

FIG. 1A is a perspective view of an electric motor/generator module according to one embodiment.

FIG. 9A is a top view and FIG. 9B is a cross-sectional view of an electric power-generating system according to one embodiment.

FIG. 10A is a top view and FIG. 10B is a cross-sectional view of an electric power-generating system according to one embodiment.

DETAILED DESCRIPTION

Figure 1B:
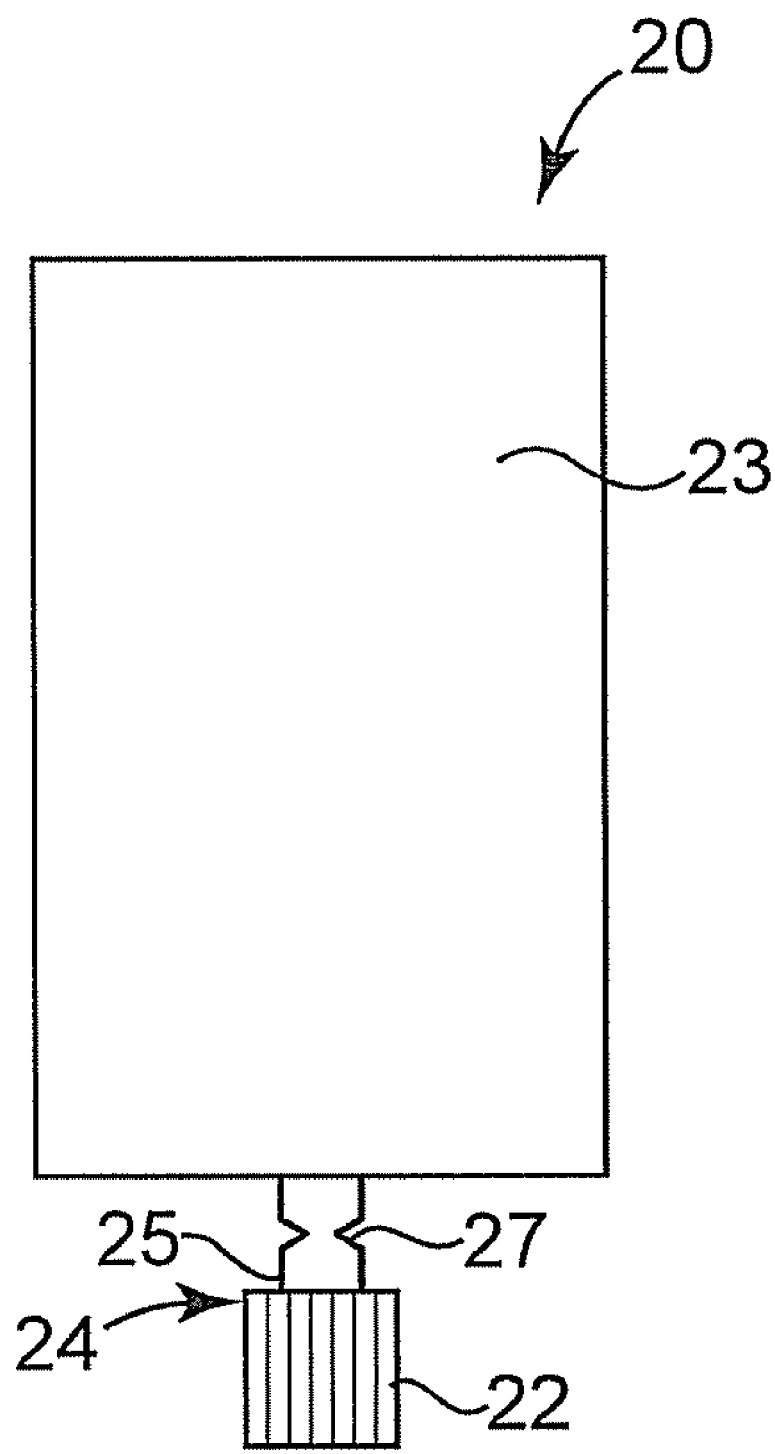
FIG. 1B is a side view of a motor/generator device of the module shown in FIG. 1A according to one embodiment.

In the following Detailed Description, reference is made to the accompanying drawings, which form a part of this specification, and in which is illustrated specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration only and is in no way limiting. It is to be understood that other embodiments may be utilized and structural or logical changes may be made without departing from the scope of the disclosure. The following Detailed Description teaches exemplary embodiments that are not to be taken in a limiting sense.

It is to be understood that features of the various exemplary embodiments described herein may be combined with each other, unless specifically noted otherwise.

In one embodiment, a system of electric motor/generators reversibly converts to and from high power, low RPM (e.g., large torque) devices and high power, high RPM (e.g., low torque) devices. The system of electric motor/generators is configured to create power by harnessing the kinetic energy of wind and/or water current, and having application when employed as a flying system, with water wheels even with relatively low water head, and/or in powering hybrid vehicles and other motorized systems.

One embodiment of a system of electric motor/generators is configured to fly in the polar front or sub-tropical jet streams and create power by harnessing the kinetic energy of wind. Another aspect provides a terrestrial system of electric motor/generators configured to create power by harnessing the kinetic energy of wind, water current, or geothermal temperature gradients.

One embodiment of an electric power-generating system is configured to convert a source of energy to electricity by turning a rotor shaft with the source of energy. The system includes a mounting plate coupled to the rotor shaft, a drive gear coupled to the rotor shaft and configured to move when the rotor shaft moves, and a plurality of motor/generator devices mounted to the mounting plate, each motor/generator device including an output shaft configured to rotatably couple with the drive gear. Each motor/generator device is coupled independently to the drive gear and is not coupled to another of the motor/generator devices such that the plurality of motor generators provides a plurality of redundant power generating motor/generator devices.

In one embodiment, multiple redundant electric motor/generators are provided in a system, where the electric motor/generators are configured to include auto-redundant backup features as described below.

One possible solution to minimize dependence on fossil fuels is a windmill kite as described in U.S. Pat. No. 6,781,254 employing an electric power-generating system and/or one or more of the motor/generator devices described below.

In a wind harnessing system, the electric power-generating system described below provides a wind turbine that is suited for coupling to a tether for use at elevation to harness wind energy. The winds cause rotation of a drive gear, which drives a shaft of each motor/generator to rotate and produce energy that can be converted into electricity.

In one embodiment, the system is reversible such that the motor/generators operate as a motor to provide power to the drive gear. Power is supplied to the plurality of motors and they in turn drive the larger gear that is attached to the rotor of the wind turbine. In this reversed mode power is consumed instead of being created.

FIG. 1A is a perspective view of an electric power-generating system 10 according to one embodiment. Power-generating system 10, also referred to as an electric motor/generator module 10, includes a mounting plate 12 coupled to a rotor shaft 16, a drive gear 14 co-axially coupled to rotor shaft 16 adjacent to mounting plate 12, and a plurality of motor/generator devices 20 mounted to mounting plate 12, where each motor/generator device 20 includes an output shaft 24 configured to rotatably couple with drive gear 14.

In one embodiment, drive gear 14 is rotatable and configured to move with rotor shaft 16, and mounting plate 12 is stationary and fixed about rotor shaft 16 by bearings. In one embodiment, drive gear 14 is coupled to rotor shaft 16 by a chain or other drive mechanism and is configured to move when rotor shaft 16 moves. Other forms of coupling drive gear 14 to rotor shaft 16 and to the plurality of motor/generator devices 20 are also acceptable.

In general, power-generating system 10 includes a rotor blade 17 or other device that is configured to interact with an energy source, such as wind, when harnessing the energy source. In one embodiment, rotor blade 17 configures power-generating system 10 to be an airborne power-generating system 10. Other suitable devices for harnessing energy sources include water wheels, blades, mills, and the like. In one embodiment, a housing 19 (a portion of which is illustrated in FIG. 1A) is optionally provided to protectively enclose mounting plate 12, drive gear 14, and motor/generator devices 20 coupled to mounting plate 12. When power-generating system 10 is configured to harness high altitude wind, a fuselage 21 is provided, a portion of which is shown in FIG. 1A.

Generally, electric motor/generator module 10 includes a frame such as mounting plate 12 (or platter 12), and drive gear 14, both of which are joined to rotor shaft 16 (or main shaft 16 or shaft 16). In one embodiment, shaft 16 is formed of non-conducting material and is configured to electrically isolate motor/generator devices 20 from platter 12. In one embodiment, platter 12 is circular or disc-shaped and is fabricated of metal such as aluminum, stainless steel, titanium, composite materials or other materials suited for aeronautic and/or terrestrial uses. Those skilled in the art will recognize that platter 12 may be fabricated of any suitable material based on the intended purpose of the nodule 10. For harnessing energy at high altitudes, in one embodiment platter 12 has a diameter of approximately 30 feet.

In one embodiment, drive gear 14 frictionally couples with output shaft 24 and neither drive gear 14 nor output shaft 24 includes teeth.

In one embodiment, drive gear 14 includes teeth 18 that are configured to mesh with teeth 22 provided on output shaft 24. Teeth 18 and teeth 22 include spur, helical, Herringbone, planetary, bevel with straight, spiral or hypoid teeth, and worm teeth. In one embodiment, teeth 18 and teeth 22 of output shaft 24 include aluminum, stainless steel, titanium, composite materials, or other suitable materials.

In one embodiment, a diameter of drive gear 14 is slightly smaller than a diameter of the platter 12. In other embodiments, the diameter of drive gear 14 is larger than the diameter of the platter 12.

The electric motor/generator module 10 generally includes a plurality of motor/generator devices 20 disposed about a circumference of drive gear 14. Suitable motor/generator devices 20 include any form of electrical motor or any form of electrical generator that has a first mode that translates electrical energy into rotational motion or translation motion, or translated rotary motion, or has a second mode that translates such motion into electrical energy, or operates in both modes, or is reversible between the first mode and the second mode. A motor/generator device includes a stand alone motor device, or a stand alone generator device, or a device that includes both a motor and a generator.

In one embodiment, the plurality of motor/generator devices 20 is configured to dissipate heat from module 10 more efficiently than a single large electricity generator dissipates heat. For example, each of the motor/generator devices 20 provides a relatively small, low mass motor/generator 20 that readily dissipates heat associated with the generation of electricity. In one embodiment, electric motor/generator module 10 is operated at altitudes of over 10,000 feet where the local air temperature is less than about 25 degrees Fahrenheit, and the relatively cool local environment contributes to rapid heat dissipation from the relatively small, low mass motor/generator 20.

In one embodiment, each motor/generator device 20 is spaced from a neighboring motor/generator device 20 along a first side of mounting plate 12. In one embodiment, the spacing of motor/generator devices 20 is selected to have a density of three motor/generator devices 20 per linear foot along a periphery of mounting plate 12. Other spacing densities for motor/generator devices 20 are also acceptable. In one embodiment, mounting plate 12 defines a side that is adjacent to drive gear 14 and a side that is opposite drive gear 14, and motor/generator devices 20 project from the side of mounting plate 12 that is opposite drive gear 14 such that output shafts 24 project from the side of mounting plate 12 that is adjacent to drive gear 14. In this manner, each motor/generator device 20 operates independently and is coupled independently to the drive gear 14 and is not coupled to another of the plurality of motor/generator devices 20, such that the motor/generator devices 20 provide a plurality of redundant power generating motor generators. Other forms of coupling motor/generator devices 20 to mounting plate 12 are also acceptable, including mounting motor/generator devices 20 and drive gear 14 on the same side of mounting plate 12.

Generally, the drive gear 14 is configured to have a greater diameter than the diameter of the output shafts 24 of motor/generator devices 20. When drive gear 14 rotates, the smaller diameter output shafts 24 of motor/generator devices 20 rotate much faster than the drive gear 14. In one embodiment, increasing the rotation rate (e.g., rotations per minute RPM) of output shaft 24 increases the voltage output from of motor/generator device 20. In one embodiment, drive gear 14 has a diameter of about 30 feet, and output shafts 24 have a diameter of about one inch, such that when drive gear 14 rotates at about 70 rotations-per-minute (RPM), output shafts 24 rotate at about 25,200 RPM. The high rate of rotation for output shafts 24 results in a high relative speed between the magnets and coils within device 20, which provides an output voltage that is utilized to generate energy. For example, in one embodiment the diameter of the drive gear 14 is approximately 30 feet while the diameter of the output shaft 24 of the motor/generator devices 20 is approximately 6 inches, such that for every complete revolution of the drive gear 14 about its axis, the output shaft 24 rotates 60 times about its axis (thus, the gear ratio is 30 feet to 6 inches or 60 to 1). Other gear ratios are also acceptable. In one embodiment, the gear ratio is selected to optimize performance and output by changing the size of the drive gear 14, the gears 22 of the motor/generator devices 20 or both.

In one exemplary embodiment, 282 five horsepower (3728 watts) motor/generator devices 20 are distributed around a drive gear 14 having a diameter of about 30 feet. Each of the 282 motor/generator devices 20 includes an output shaft 24 having a diameter of one inch and the drive gear 14 is rotated by an energy source (such as the wind) at about 70 rpm, such that each shaft 24 of each motor/generator device 20 rotates at about 25,000 RPM to produce about 1 MW of power that can be converted to electricity.

FIG. 1B is a side view of motor/generator device 20 according to one embodiment. Motor/generator device 20 includes a winding case 23 enclosing electrical wire windings of a motor and/or a generator and suitable motor components (not shown), and output shaft 24 extends from winding case 23.

In one embodiment, shaft 24 includes axel 25 rotatably coupled to winding case 23. During use, it is expected that motor/generator devices 20 might experience bearing breakdown that might prevent rotation of axel 25. In one embodiment, axel 25 includes a score 27 that is configured to selectively fracture axel 25 when bearings within winding case 23 freeze or otherwise become immobile. In the case where one or more motor/generator devices 20 become worn over time, axel 25 is configured to fracture along score 27, thereby rendering motor/generator device 20 inoperable. In one embodiment, a clutch is provided in communication with each motor/generator, where the clutch is configured to disengage a seized motor/generator from engagement with drive gear 14. In one embodiment, a solenoid mechanism is provided in communication with each motor/generator, where the solenoid mechanism is configured to disengage a seized motor/generator from engagement with drive gear 14. In this manner, motor/generator devices 20 that become inoperable will automatically remove themselves from power generating system 10 (FIG. 1A) to provide an auto-redundant power generating backup system in which one or more failed devices 20 do not hinder continued operation of system 10.

In one embodiment, system 10 includes an excess number of motor/generator devices 20 beyond a number that is computed to provide desired power output. Each of the motor/generator devices 20 is operated at less than 100% output (for example, and output of 96%), such that the total combined number of motor/generator devices (including the excess number of devices) contributes to providing 100% of the desired output. As motor/generator devices 20 become worn, the inoperable devices 20 automatically drop out of system 10 as described above and the remaining devices operate at a slightly increased output (for example 96.5%) to enable system 10 to maintain 100% of the desired output.

In one embodiment, multiple motor/generator devices 20 are provided to include an excess number N, where the number N of extra devices 20 remain idle or otherwise in an "off" configuration until an operating motor/generator device 20 wears out. When a motor/generator device 20 wears out, one of the extra N devices 20 is brought online, for example under the action of a controller coupled to system 10 (FIG. 1A). In one embodiment, an electronic controller is coupled to module 10 to selectively add operable motor/generator devices 20 and selectively remove inoperable motor/generator devices 20 to/from module 10.

In one embodiment, an additional output shaft 24n or additional gears 22n is provided for each one of the individual motor/generator devices 20 to both allow for the addition of a simple gear train on each individual motor generator. For example, include a 2 to 1 ratio on the individual motor/generator devices 20 to enable halving the diameter of the drive gear 14.

Traditionally, power is transmitted at high voltage to minimize electrical loss in the power lines. Insulating lines that carry high voltage power necessitate substantial amounts of electrical insulation. High levels of electrical insulation add weight, such that highly insulated high voltage generators are ill-suited for flying electricity generators.

In one embodiment, electrical motor/generator module 10 includes multiple motor/generator devices 20 that is each configured for operation at a relatively low voltage (for example between 100-1000 volts) and is suitably insulated to enable module 10 to be flown in the jet stream. The low voltage motor/generator device 20 necessitates less insulation, and thereby weighs less. In addition, the multiple motor/generator devices 20 are configured to be electrically coupled in series, for example, such that about 100 motor/generator devices 20 each producing about 300 volts is coupled in series to provide a module 10 providing about 30,000 volts. In this manner, multiple low voltage, low weight motor/generator devices 20 combine to provide a high output voltage system 10.

In one embodiment, system 10 includes multiple low voltage devices aggregated into a high voltage system that is configured to generate electricity at high altitude. Paschen's law states that the breakdown voltage of air between a gap is a non-linear function of the product of gas pressure and the gap distance. Thus, higher altitudes (having lower air pressure) are associated with a lower breakdown voltage in an electrical system. As a consequence, additional electrical insulation is needed to overcome the breakdown voltage in air when the electrical system is operated at high altitudes. The breakdown voltage phenomenon described by Paschen's law is even more accentuated for small diameter wires, as are employed in wire wound electricity generators. For all of these reasons, multiple light weight (minimally insulated) low voltage motor/generator devices 20 electrically coupled into system 10 are selected to provide electricity generation at high altitude. These features contribute to a very broad range of input/output voltage performance by system 10.

Figure 2:
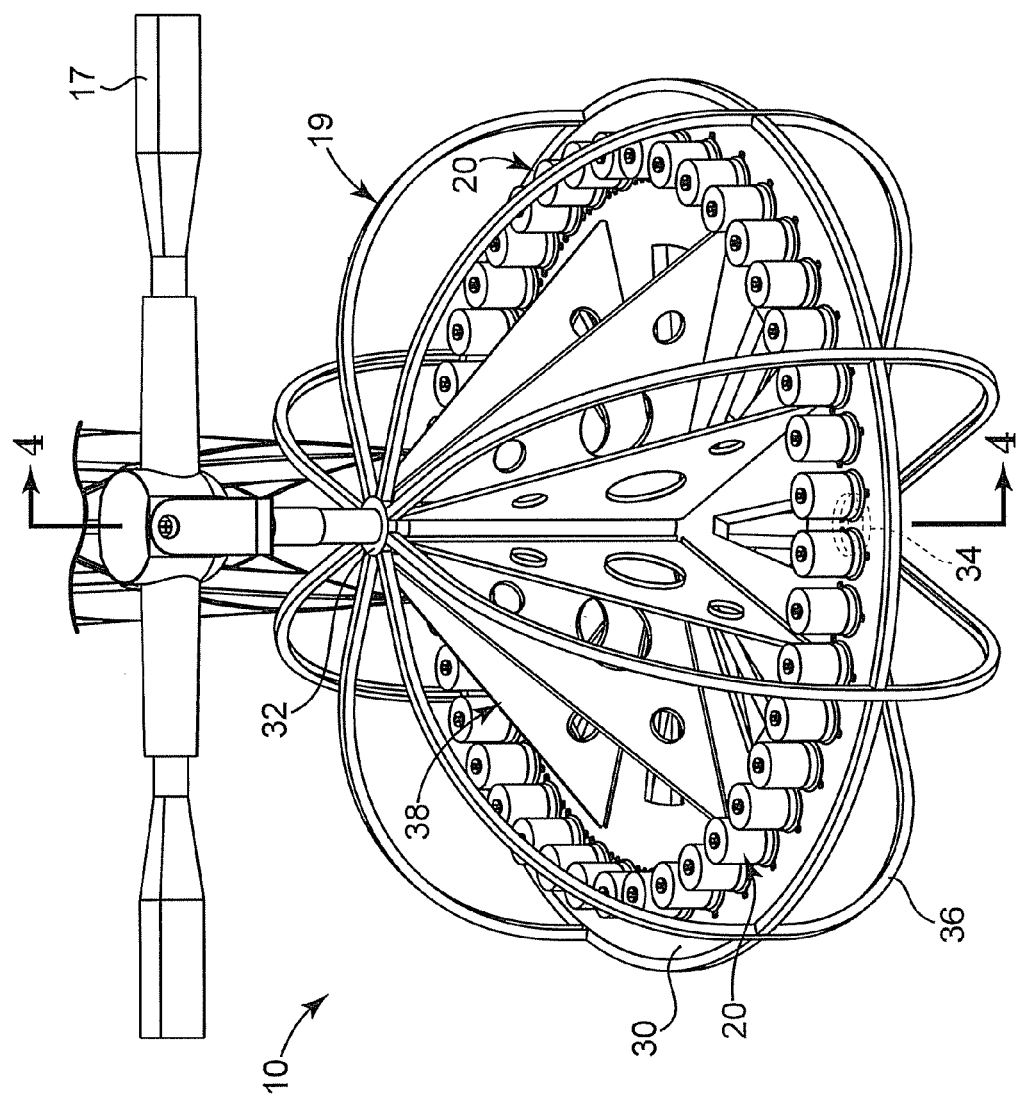
FIG. 2 is a perspective view of the electric motor/generator module shown in FIG. 1A illustrating a shell of a housing for the module.

FIG. 2 is a perspective view of one embodiment of module 10 illustrating an internal portion of housing 19. In one embodiment, housing 19 includes a load floor 30, an upper retainer 32 coupled to rotor shaft 16, a lower retainer 34, a plurality of support struts 36 extending between upper retainer 32 and lower retainer 34, and support plates 38 coupled between load floor 30 and upper retainer 32. In general, a shell or other exterior structure (neither shown) is fitted over housing 19. Shell or exterior structure can include fabric shells or high strength-to-weight casings, such as aluminum panels.

In one embodiment, load floor 30 is mounting plate 12 (FIG. 1A). Alternatively, load floor 30 is coupled to mounting plate 12. In one embodiment, load floor 30 includes Hexcel™ disposed between upper and lower aluminum plates, for example. In one embodiment, upper retainer 32 is an upper bearing retainer coupled to rotor shaft 16 to enable rotor shaft to rotate inside upper bearing retainer 32. In one embodiment, lower retainer 34 provides a lightweight reinforcement having a high strength-to-weight ratio. In one embodiment, support strut 36 include aluminum 7075C channel struts coupled between upper retainer 32 and lower retainer 34, and plates 38 include aluminum plates or other suitable plates having a high strength-to-weight ratio material.

Module 10, in at least one configuration, is configured to fly to high altitudes, such that suitable materials for housing 19 include lightweight composite materials, lightweight metal materials, composite materials and laminates of polymer materials, and laminates of polymer and metal materials.

Figure 3:
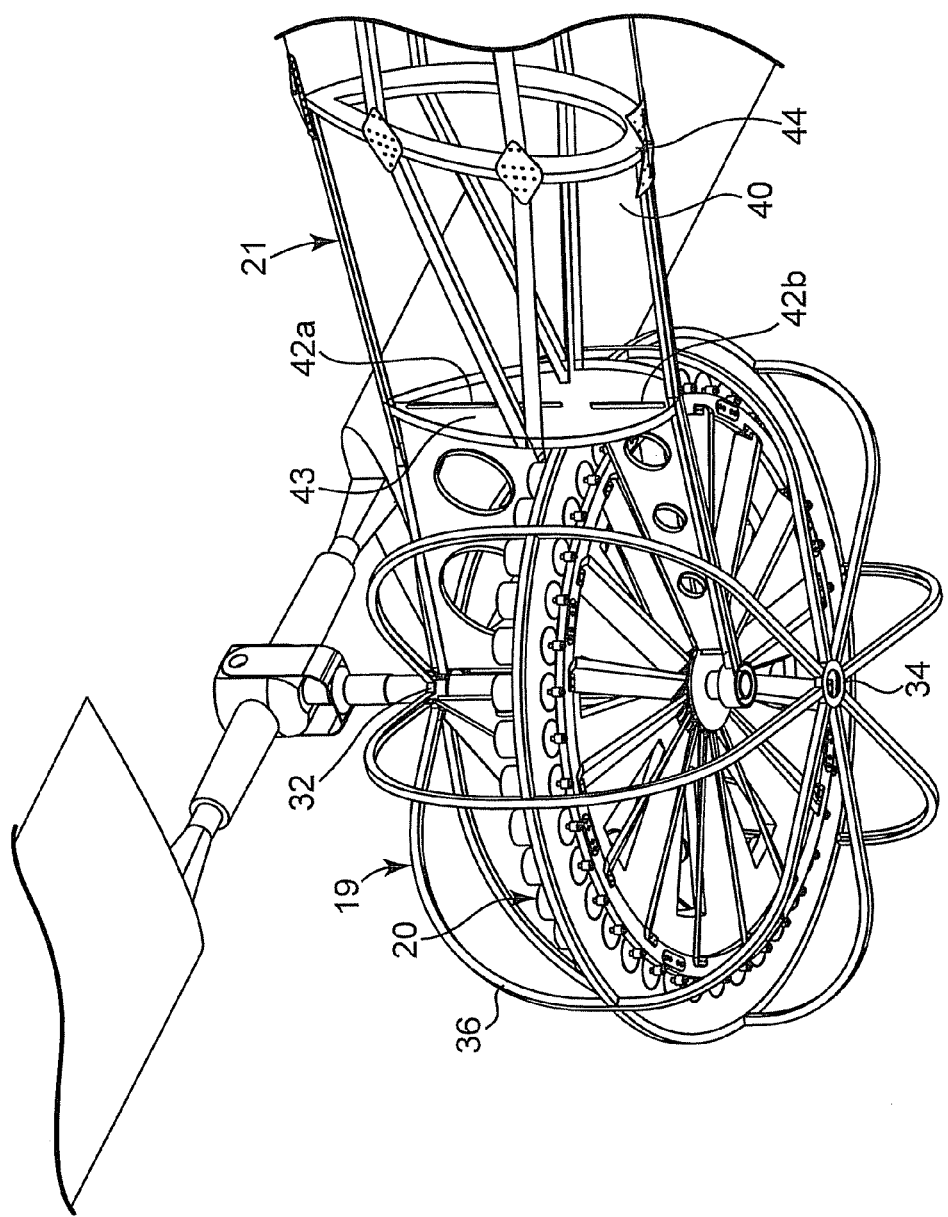
FIG. 3 is another perspective view of the electric motor/generator module showing a portion of a fuselage extending from the shell of the housing.

FIG. 3 is another perspective view of one embodiment of module 10 illustrating a portion of fuselage 21. In one embodiment, fuselage 21 includes a boom 40 coupled to housing 19, where boom 40 includes an upper sheer web 42a, a lower sheer web 42b spaced from upper web 42a, where webs 42a, 42b are coupled to a bulkhead 43. In one embodiment, boom 40 includes multiple section supports 44 distributed along a length of boom 40.

Figure 4:
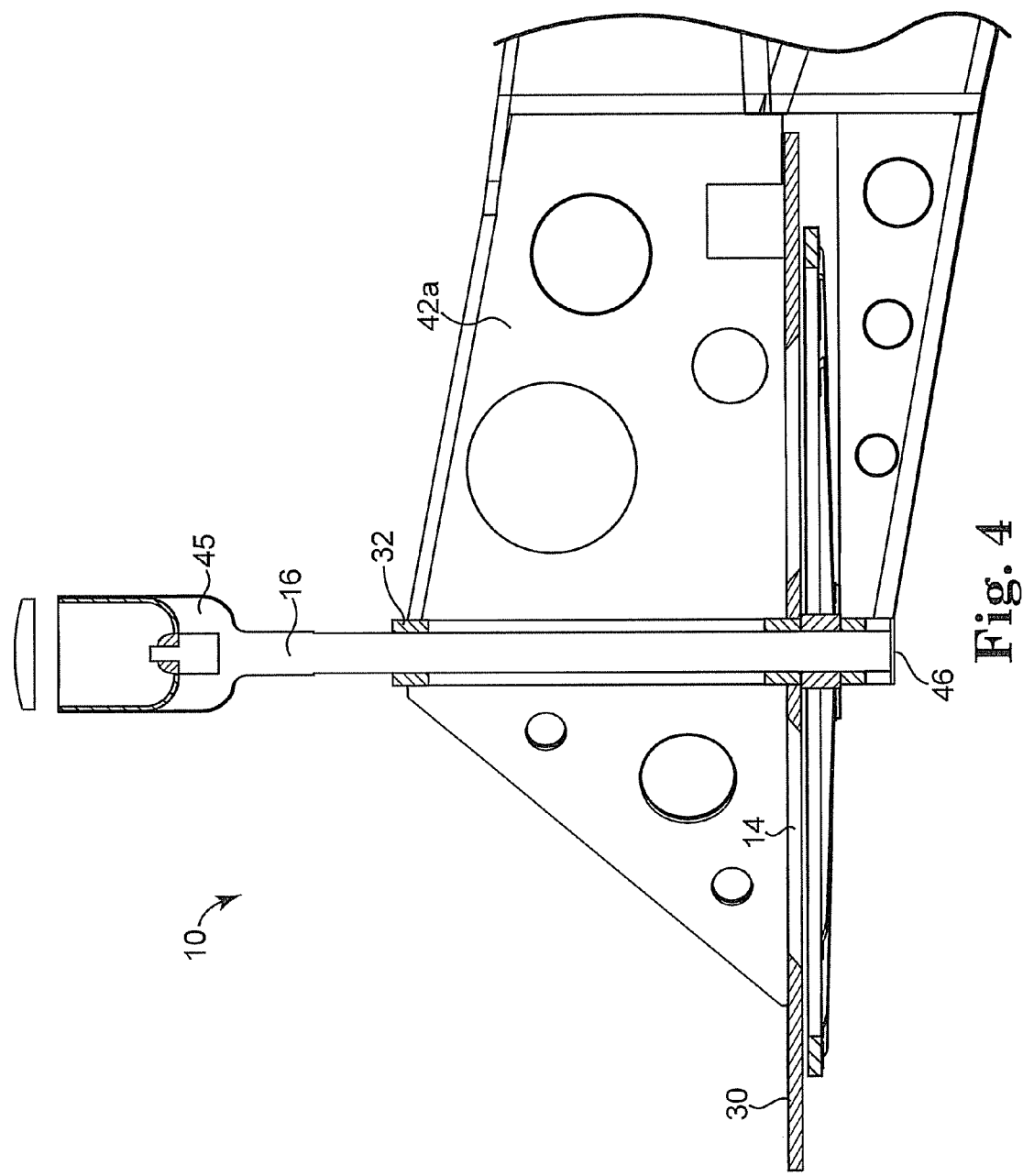
FIG. 4 is a cross-sectional view of the electric motor/generator module taken along line 4-4 of FIG. 2.

FIG. 4 is a cross-sectional view of one embodiment of module 10 taken along line 4-4 of FIG. 2. Motor/generators 20 (FIG. 2) are not illustrated. In one embodiment, rotor 16 extends between a rotor hub 45 coupled to rotor blade 17 (FIG. 2) and a slip ring 46. In one embodiment, slip ring 46 provides rotor pitch servo motor control and is coupled to a lower end of drive gear 14 as oriented in FIG. 4.

Figure 5:
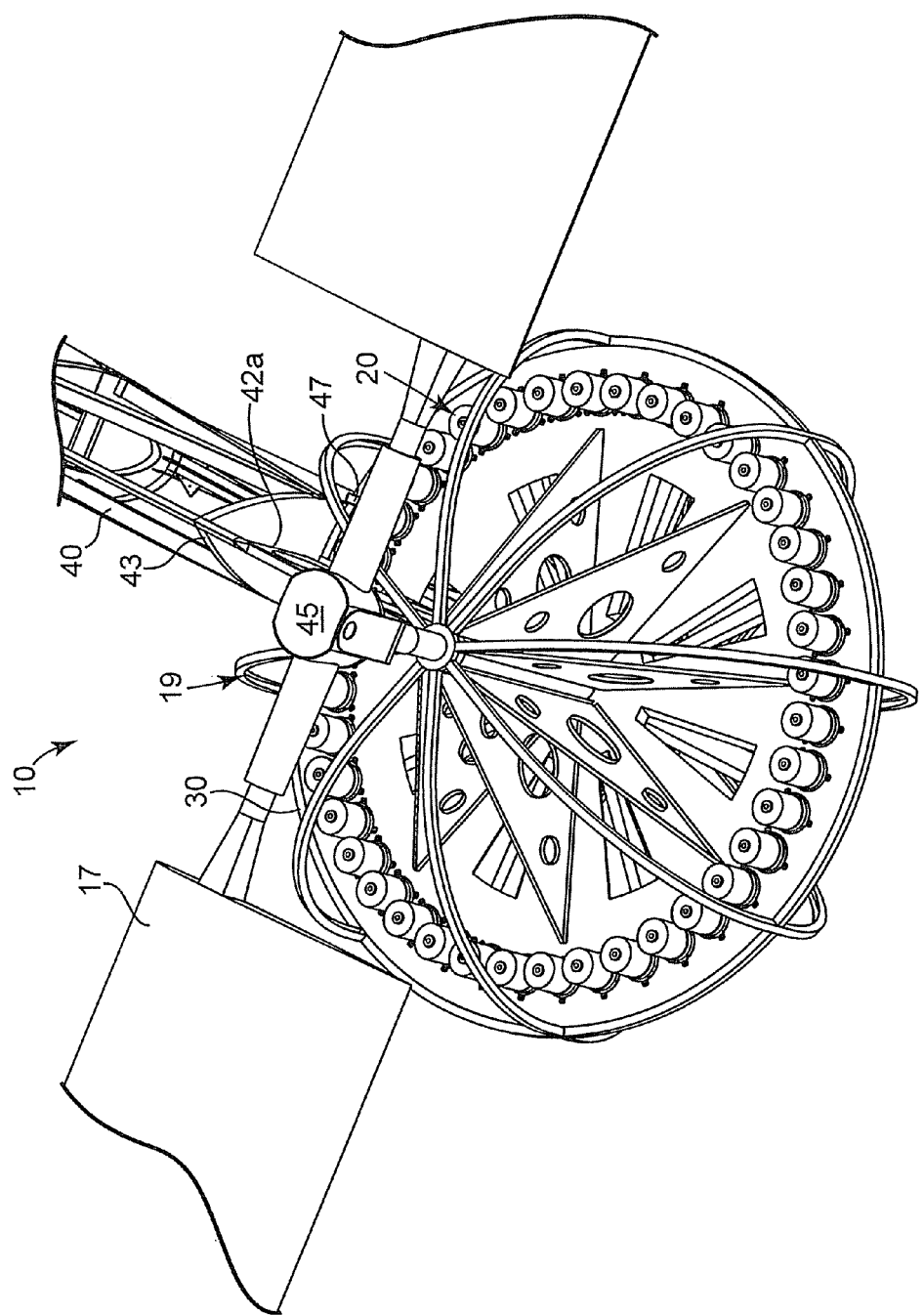
FIG. 5 is a top perspective view of a boom of the fuselage extending from the shell of the housing and from the motor/generator module.

FIG. 5 is a top perspective view of one embodiment of module 10. Upper sheer web 42a is coupled to bulkhead 43 and boom 40 is coupled to load floor 30 (FIG. 2) by one or more stringers 47. In one embodiment, boom 40 extends from housing 19 and is configured to counteract gyroscopic precession of rotor blade 17, which enables module 10 to tilt relative to moving rotor 16 (FIG. 4).

Figure 6:
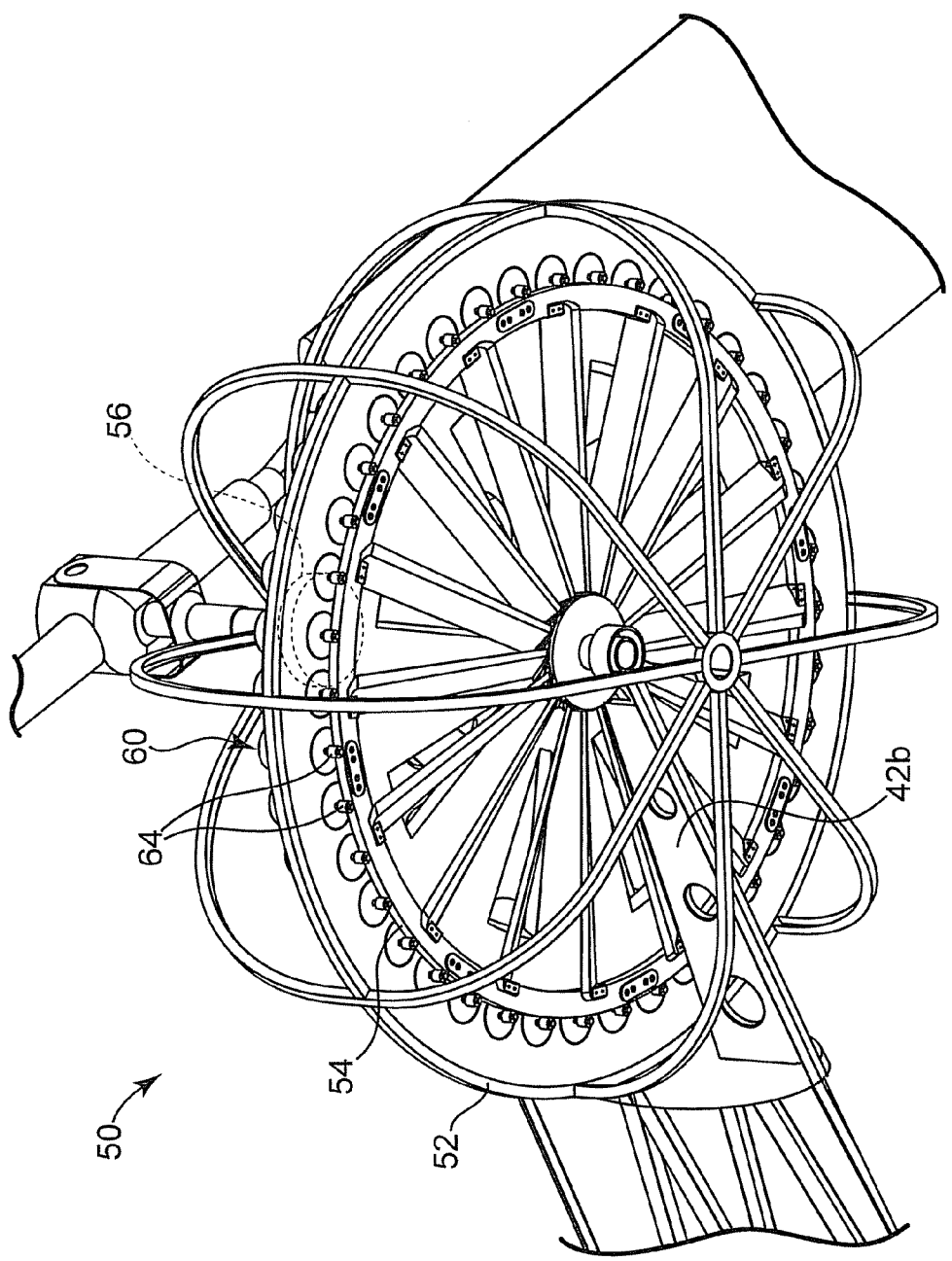
FIG. 6 is a bottom perspective view of an electric motor/generator module according to one embodiment.

FIG. 6 is perspective view of a power generating system 50 according to one embodiment. System 50 includes a mounting plate 52 coupled to a rotor shaft 56, a drive gear 54 co-axially coupled to rotor shaft 56 adjacent to mounting plate 52, and a plurality of motor/generator devices 60 mounted to mounting plate 52, where each motor/generator device 60 includes an output shaft 64 configured to rotatably couple with drive gear 54.

In one embodiment, drive gear 54 provides cooling to system 50 and is rotatable and configured to move with rotor shaft 56, and mounting plate 52 is stationary and fixed to rotor shaft 56. In one embodiment, output shafts 64 frictionally couple with drive gear 54 such that movement of drive gear 54 results in the rotation of output shafts 64. In a manner similar to that described above, drive gear 54 is selected to have a diameter that is much larger than a diameter of output shaft 64, such that rotation of drive gear 54 results in high RPM rotation of output shaft 64.

Figure 7:
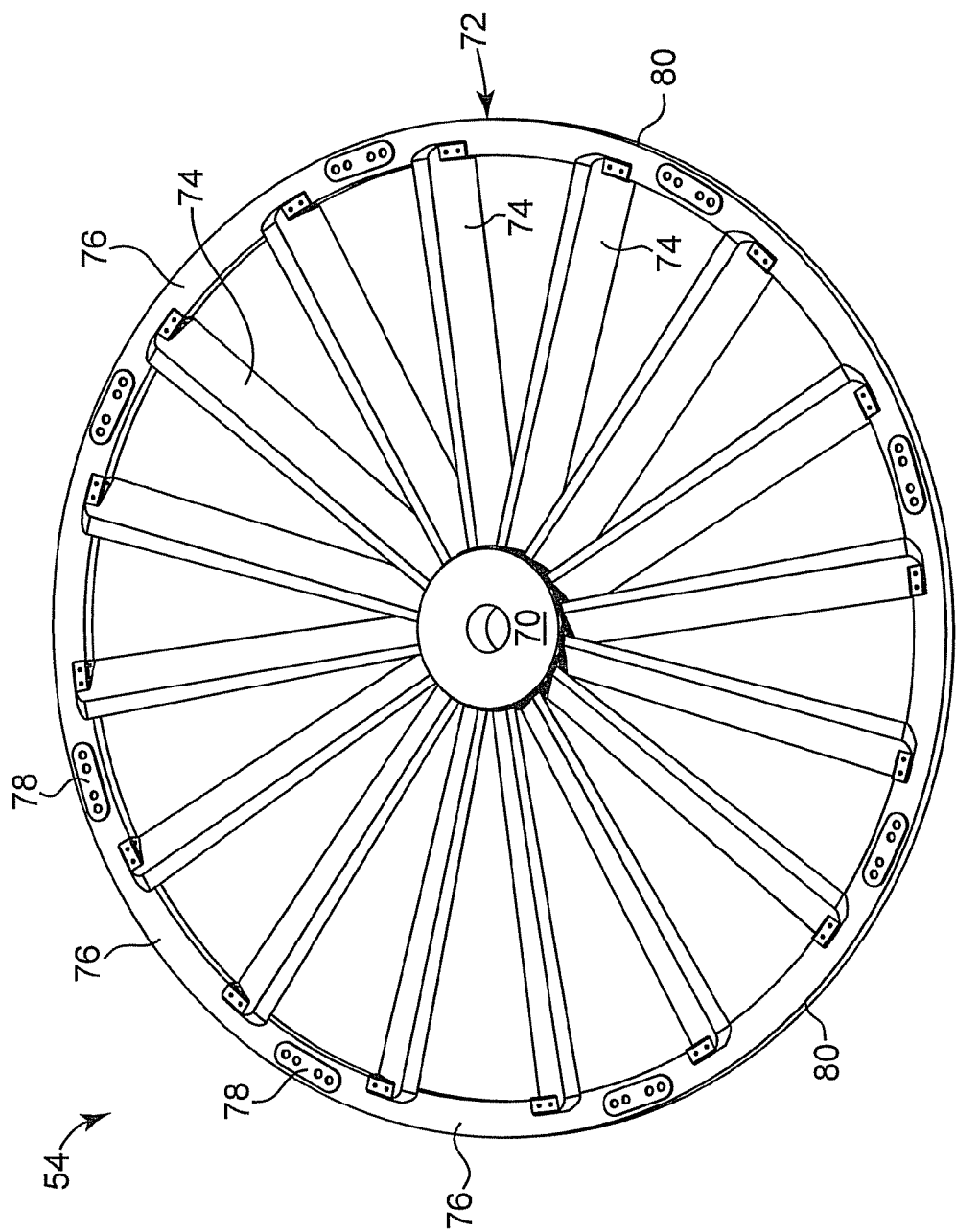
FIG. 7 is a perspective view of a drive gear of the electric motor/generator module illustrated in FIG. 6 where the drive gear includes blades/spokes configured to provide an integral cooling feature for the motor/generator module.

FIG. 7 is a perspective view of one embodiment of drive gear 54. In one embodiment, drive gear 54 is an integral cooling fan drive gear 54 and includes an inner peripheral ring 70, an outer peripheral ring 72, and blades 74 extending between inner ring 70 and outer ring 72. In one embodiment, inner ring 70 provides an inner bearing ring configured to couple about rotator shaft 56 (FIG. 6). In one embodiment, outer peripheral ring 72 includes multiple sections 76 of arced members coupled to an adjacent section 76 by a bracket 78. Approximately eight sections 76 are provided to define circular outer ring 72. Example embodiments of blades 74 include but are not limited to fan blades (as shown), spokes, aerodynamically-shaped blades, round spokes (not necessarily aerodynamically-shaped) configured to support inner ring 70 and outer ring 72, or a solid disk. Other suitable shapes for blades 74 are also acceptable.

In one embodiment, inner ring 70 is a cast aluminum ring, each section 76 includes a 50% glass filled nylon filler disposed between aluminum plates, and blades 74 are formed of 0.125 inch glass epoxy skins formed over a Hexcel™ core. In one embodiment, an outer peripheral surface 80 of outer ring 72 is configured to frictionally engage with output shafts 64. In one embodiment, outer peripheral surface 80 is a frictional surface that does not include teeth. In another embodiment, outer peripheral surface 80 provides a plurality of teeth (not shown) configured to mesh with teeth provided on output shaft 64 (FIG. 6). Suitable teeth include spur, helical, herringbone, planetary, bevel, spiral, hypoid, and worm teeth.

Generally, motor/generator devices 20 refers to any form of electrical motor or any form of electrical generator having means for interacting with the drive gear 14. In addition, motor/generator devices 20 include any device that is capable of translating rotational motion or translated rotary motion into electrical energy. Conversion or translation of the rotational motion or rotary motion can include additional converters or generators. The electrical energy or electricity generated by the electric motor/generator module 10 can be sent to the ground via a suitable electrical line 26 or tether 26, and the generated electricity can be used to power electrical devices or stored electrochemically (e.g., in an electrochemical reaction that creates hydrogen by electrolysis) or other types of storage devices for later use.

Figure 8:
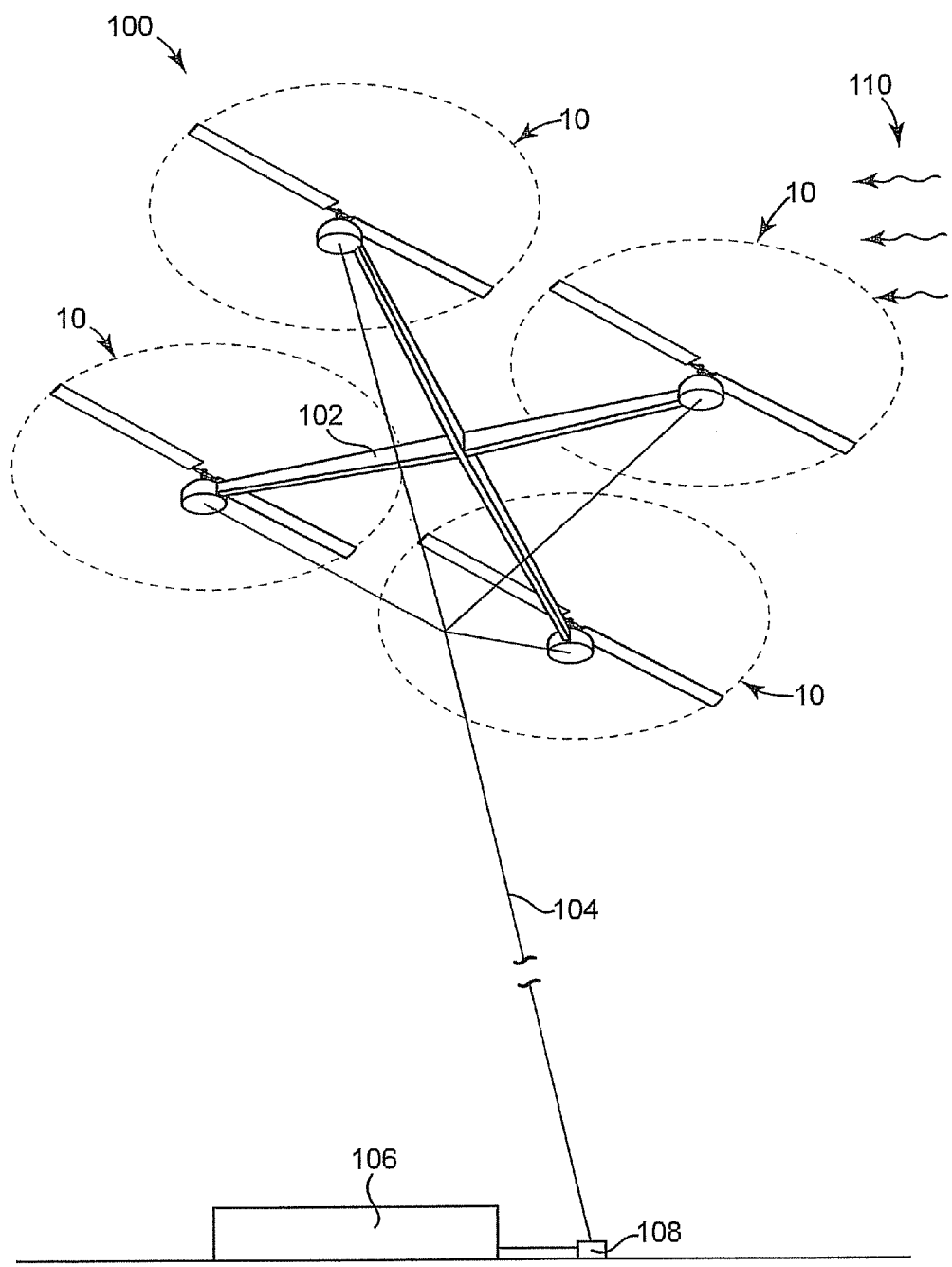
FIG. 8 is a perspective view of a flying electric motor generator system employing multiple electric motor/generator modules according to one embodiment.

FIG. 8 is a perspective view of one embodiment of a flying electricity generator system 100 employing multiple electric motor/generator modules 10 as described above. System 100 includes four electric motor/generator modules 10 interconnected by a frame 102, and a tether 104 attached to frame 102 that is configured to deliver electricity generated by modules 10 to a substation 106 or a bus 106. In other embodiments, a suitable number (more than four or fewer than four) of electric motor/generator modules 10 are coupled to frame 102.

In one embodiment, tether 104 is fed from a winch 108 and is configured to enable modules 10 and frame 102 to be flown in a kite-like manner into the jet stream, for example between about 10,000 feet to about 32,000 feet (nearly 10 kilometers) above the earth's surface. In one embodiment, tether 104 is a 3-inch thick electrically conductive Kevlar line. In other embodiments, tether 104 is a braided steel cable configured to conduct electricity and to stabilize modules 10 and frame 102. Other suitable forms of tether 104 are also acceptable. Although a cable-like tether is shown, it is understood that the electric generator system 100 can include a tower or other ground support configured to create a ground-based wind energy system.

In one embodiment, electric generator system 100 includes a global positioning system (GPS) (not shown) capable of relaying real-time, three-dimensional position information to a user on the ground.

Embodiments provide an electric power-generating system including a plurality of independent and redundant power-generating motor/generator devices. The number of motor/generator devices is selected to provide a desired output voltage for the system with individual relatively low-voltage motor/generators. In one embodiment, multiple motor/generators are wired in one of many possible series and parallel combinations to produce a variety of output voltages for the system. For example, where the number of motor/generators=N, and each motor/generator produces a voltage=V, the output voltages for the system selectively varies from V (all motor/generators wired in parallel) to N*V (all motor/generators wired series). In one exemplary embodiment, an appropriate number of individual and redundant power-generating motor/generator devices each providing about 380 volts are coupled together to provide about 25,000 volt output for the module. In another example, the output voltage for each module can be selectively varied in a range approximately between 25,000 to 50,000 volts through the use of an appropriate number of individual and redundant power-generating motor/generator having a voltage of less than about 2000 volts.

There are a variety of possible configurations for mounting the motor/generator devices relative to a drive gear of the system, several of which are disclosed below.

Figure 9A:
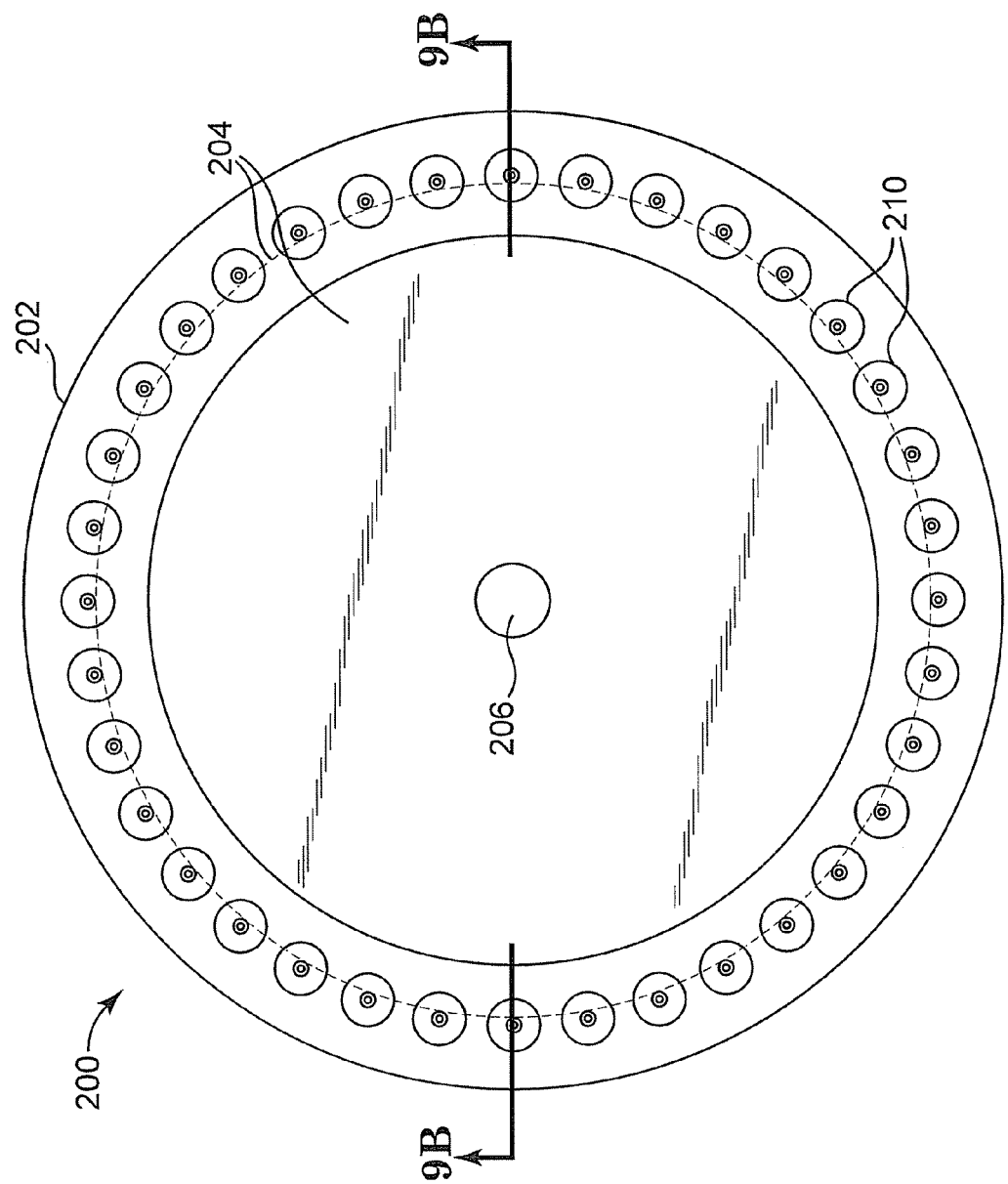

FIG. 9A is a top view and FIG. 9B is a cross-sectional view of an electric power-generating system 200 according to one embodiment. System 200 includes a mounting plate 202 coupled to a frame 203, a drive gear 204 coupled to a rotor shaft 206 that communicates through frame 203, and multiple independently operable and redundant motor/generator devices 210 that are mounted to mounting plate 202. Rotation of rotor shaft 206 rotates drive gear 204, and the rotating drive gear 204 rotates an output shaft 222 of each motor/generator device 210 to generate an output voltage and provide electricity. In one embodiment, rotator shaft 206 is rotated by wind, which rotates output shafts 222 to convert the wind to electricity within motor/generator device 210 for subsequent use in homes and businesses.

In one embodiment, mounting plate 202 includes a first side 212 opposite a second side 214 that is adjacent to a major surface 216 of drive gear 204. Output shaft 222 extends from each motor/generator device 210 to engage with a peripheral edge 224 of drive gear 204.

In one embodiment, peripheral edge 224 includes a lubricating polymer. For example, in one embodiment peripheral edge 224 is formed as an annular ring around drive gear 204, provides teeth that mesh with output shafts 222, and is formed of a lubricating polymer. Suitable lubricating polymers include polyetheretherketone (PEEK) or a polyimide available under the tradename VESPEL®, although other lubricating polymers are also acceptable. The systems described herein are configured for high altitude flight (above 25,000 feet), and at these altitudes the air temperature is generally below zero Fahrenheit. Other forms of lubrication, such as oil or graphite, could possibly fail to properly lubricate at temperatures around −40 degrees Fahrenheit. In one embodiment, at least peripheral edge 224 is formed of a lubricating polymer such as PEEK or polyimide to ensure lubrication at the meshing interface between output shafts 222 and drive gear 204.

The linear density, e.g. the placement of motor/generator devices 210 along mounting plate 202, is selectively varied depending upon a desired output voltage. In one embodiment, drive gear 204 has a diameter of about 30 feet, each output shaft 222 has a diameter of about 0.083 feet, and motor/generator devices 210 are mounted around a periphery of mounting plate 202 at a linear density of about 3 motor/generator devices 210 per foot. Sizing each motor/generator device 210 for an output of about 380 volts configures system 200 to provide a total output voltage of about 102,000 volts. Other placement densities for motor/generator devices 210 of other output voltages are also acceptable.

Suitable motor/generator devices include two-phase alternating current devices, three-phase AC devices, or DC devices. In one embodiment, motor/generator device 210 includes a brushless permanent magnet motor having a motor diameter in a range between approximately 0.5 inch and 10 inches, a power level in a range between approximately 0.5 W and 150 kW, and a rotational speed for output shaft 222 in a range between approximately 20,000 and 30,000 RPM. One suitable such motor/generator device is identified as the AVX50BL10 brushless motor available from AVEOX, Simi Valley, Calif. These canister-style motor/generators have a height that is greater than a diameter of the canister. The diameter of the canister is generally less than 10 inches (with a radius of less than 5 inches), such that a linear velocity of the magnet passing by the coil is less than 5 inches per second per RPM.

Other suitable motor/generators include pancake motors. One suitable pancake motor is the series 30 motor model number M32N1-XXX available from Light Engineering Inc., Indianapolis, Ind. One suitable pancake generator includes the series 30 model G32N1-XXX generator having a rated speed of 2,500 RPM, a power output of 12 kW. The pancake-style motor generator generally has a larger diameter than the canister style, such that the linear speed of the magnet relative to the coil is greater than 5 inches per second per RPM.

Figure 10A:
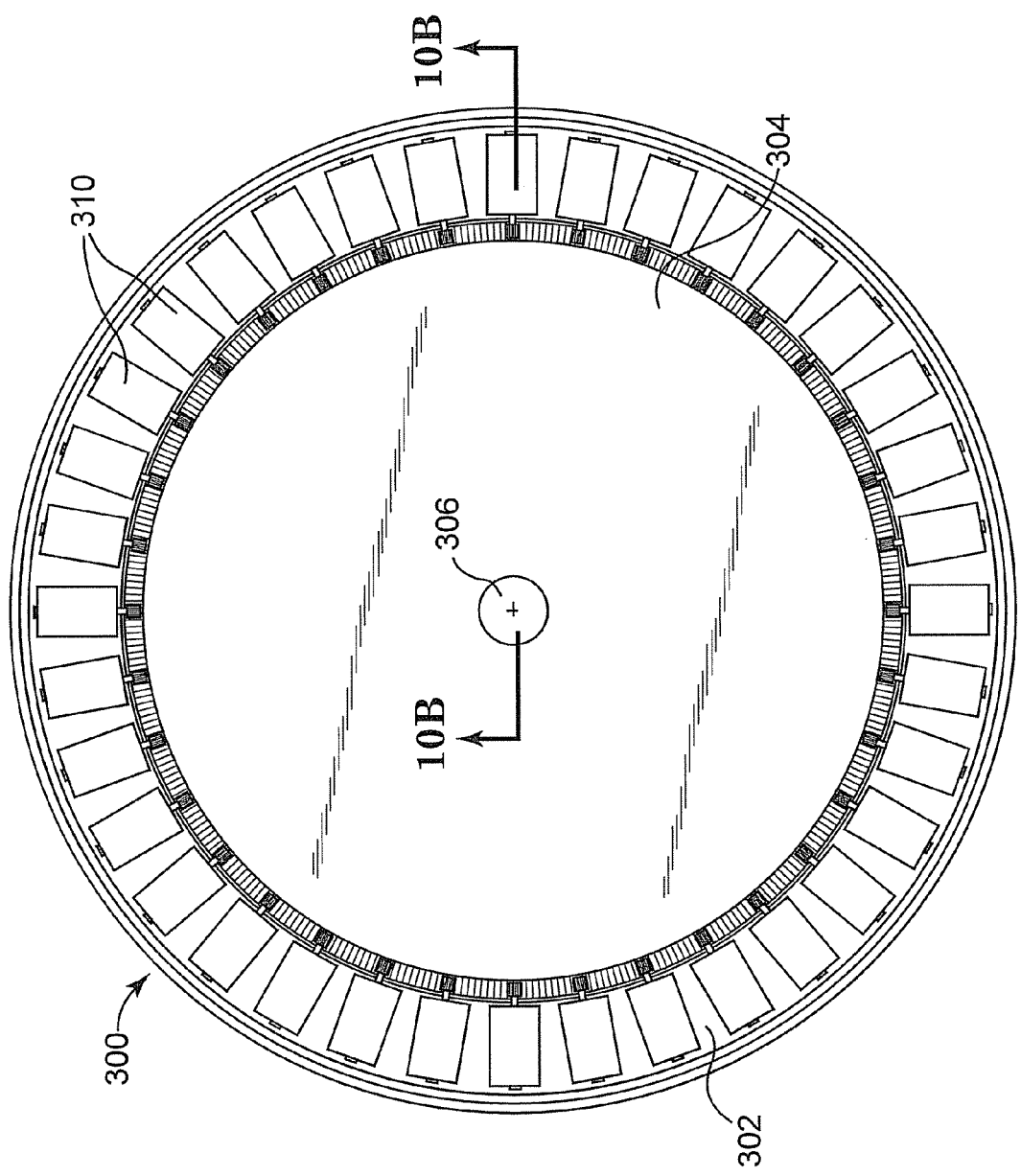

FIG. 10A is a top view and FIG. 10B is a cross-sectional view of an electric power-generating system 300 according to one embodiment. System 300 includes a mounting plate 302 coupled to a frame 303, a drive gear 304 coupled to a rotor shaft 306 that communicates through frame 303, and multiple independently operable and redundant motor/generator devices 310 coupled to mounting plate 302 and extending to drive gear 304.

In one embodiment, mounting plate 302 and drive gear 304 are disposed in plane A such that mounting plate 302 is substantially co-planar with drive gear 304. Motor/generator devices 310 are spaced apart around mounting plate 302 to provide a desired linear density of devices 310 that combine to provide a selected voltage output for system 300. In one embodiment, pairs of motor/generator devices 310 are mounted substantially parallel to the plane A. For example, in one embodiment drive gear 304 includes a first major surface 312 opposite a second major surface 314, and a pair of motor/generator devices 310 are mounted on mounting plate 302 such that a first one of the devices 310 communicates with first major surface 312 and a second one of the devices 310 communicates with the second major surface 314. In one embodiment, the pairs of motor/generator devices 310 are mounted substantially parallel to the plane A, and each motor/generator device 310 in the pair is staggered (i.e., having a lateral offset) relative to its mate.

In one embodiment, drive gear 304 has a diameter of several feet, such that when drive gear 304 rotates there is a possibility that an outer peripheral edge of drive gear 304 will wobble or possibly be slightly out of alignment. In one embodiment, a shock absorbing or damping system 330 is provided that is mounted between mounting plate 302 and motor/generator devices 310 to enable the devices 310 to move out of the plane A and dampen/adjust to wobble that is present in drive gear 304. In one embodiment, shock absorbing system 330 includes a spring 332 attached between mounting plate 302 and device 310, although other shock absorbers are also acceptable.

In one embodiment, each motor/generator device 310 includes an output shaft 322 that extends to engage with one of the major surfaces 312, 314 of drive gear 304. In one embodiment, the major surfaces 312, 314 include drive teeth at an outer periphery that are configured to mesh with drive teeth provided on output shafts 322, and the interface between drive gear 304 and output shaft 322 includes a lubricating polymer 324, such as the PEEK or polyimide as described above.

Figure 11:
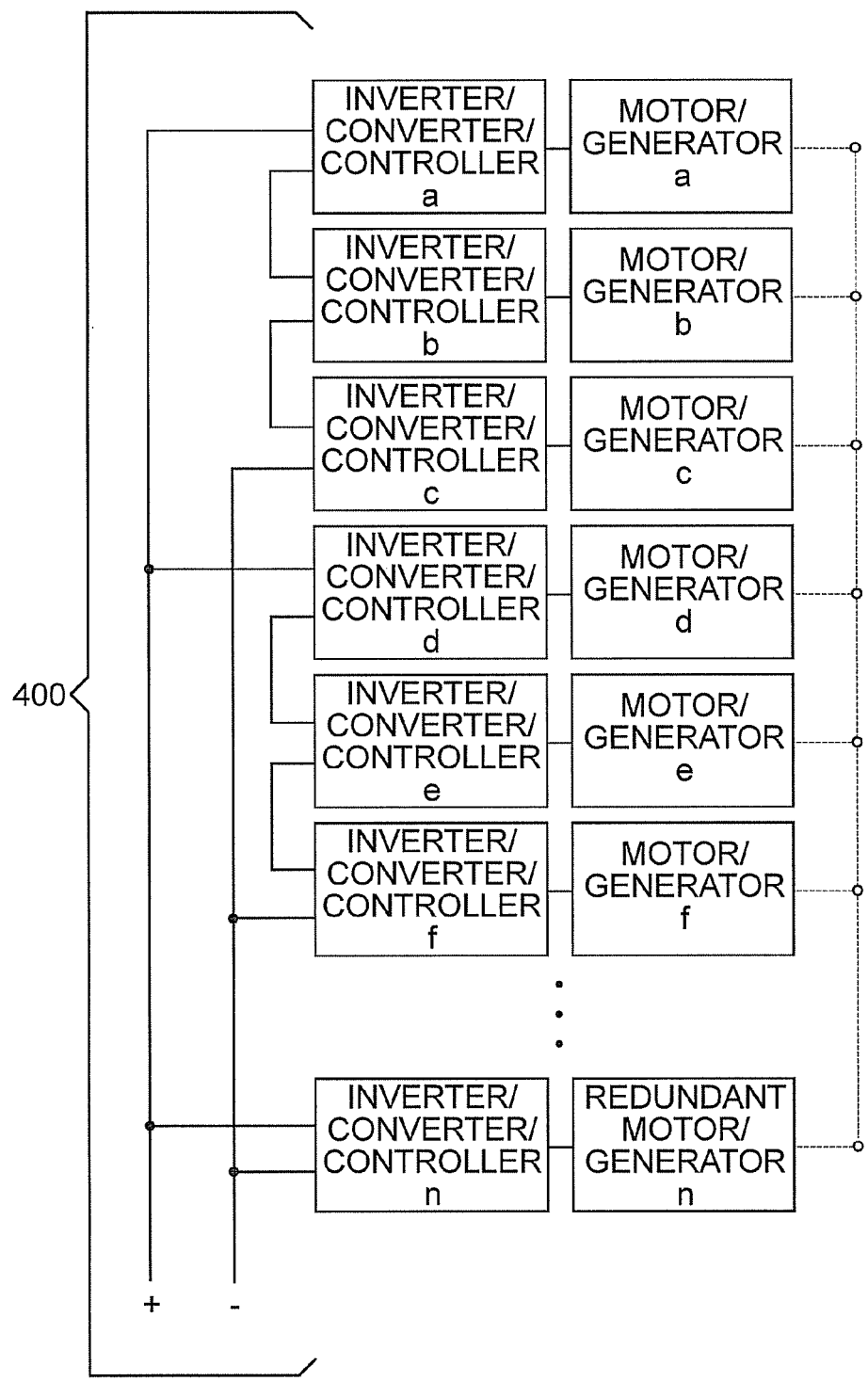
FIG. 11 is a schematic illustrating a series of motors grouped in parallel to provide a desired total voltage output for a motor/generator module according to one embodiment.

FIG. 11 is a block diagram of a series of motor/generators 400 grouped in parallel to provide a desired voltage output for electric motor/generator module 10 according to one embodiment. In one example embodiment, a number of motor/generators (motor/generators a through motor/generators n) are coupled together in series to provide a voltage output for each module 10 (FIG. 1), and a number of such modules are coupled in series such that each electricity-generating system 100 (FIG. 8) of modules produces about 1 MW of power. In one embodiment, flexibility in the desired output voltage for the system is provided through selectively wiring multiple motor/generators (a . . . n) or pairs of motor/generators of a given output voltage in various combinations. Thus, output voltage of the system is selectively varied through selected wiring combinations without changing the output voltage of each motor/generator. In one example embodiment, a large number of low voltage motor/generators (e.g., less than about 500 volts) are grouped in parallel and connected in a series to provide about 5,000 volts out of one module 10, or a smaller number of high voltage motor/generators (e.g., more than about 500 volts) are hooked in series to provide about 5,000 volts out of each module 10, as detailed in the examples below.

Example 1

In one example embodiment, a 1 MW module 10 (FIG. 1) is provided by ten motor/generators 20 each producing about 0.1 MW. In one example embodiment, it is desired to provide about 20,000 volts down tether assembly 40 to Earth, and the system 100 (FIG. 8) includes four modules 10 as illustrated, such that each module 10 is configured to produce about 5,000 volts. The about 20,000 volts down tether assembly 40 to Earth is achieved by providing ten motors at about 500 volts each, where the motors are hooked in series.

Example 2

In one example embodiment, motor/generators 20 are selected to produce about 1,000 volts instead of 500 volts. Pairs of these 1000 volt motor/generators are hooked in parallel and five such pairs are hooked together in series to produce the desired about 5,000 volts out of module 10. This approach lowers the current since the 1000 volt motor/generators are employed to produce the same about 10 MW power out from module 10. Lowering the current enables the use of smaller wires and smaller windings, which results in lighter machine. Thus, each module 10 pulls half as much amperage even though it still produces the same about 1 MW of total power out. Halving the current enables the use of smaller windings of finer wires which results in a module having lighter weight.

Example 3

In one example embodiment, three-hundred "smaller" motor/generators are employed to provide about 30,000 volts down tether assembly 40 to Earth from four modules 10. 30,000 volts down to Earth from four modules 10 translates to each module 10 having an output of about 7,500 volts. 7,500 volts from each module evenly divided over the three-hundred motor/generators results in each motor/generator producing about 25 volts. Hooking these three-hundred 25 volt motor/generators in series will produce about 7,500 volts out of each module and about 30,000 volts down the tether to Earth. In one embodiment, some of the motor/generators are redundant motor/generators such that even if several motor/generators fail during flight, a sufficient number of motor/generators will remain in operation to produce the desired and calculated output voltage for the system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electric generating system comprising:
   a frame configured to couple to a tether system;
   at least one power generation module mounted to the frame comprising:
   a holding structure attached to the frame;
   a rotating structure, including a rotor shaft, configured to rotate relative to the holding structure;
   a rotor attached to the rotor shaft; and
   a plurality of motor/generators attached to the holding structure, each including a drive shaft configured to engage with the rotor shaft,
   wherein the electric generating system is configured to operate in:
   a first mode wherein the motor/generators are configured to receive electrical energy from the tether system and drive the drive shafts to create a torque on the rotor shaft to thereby rotate the rotor and create lift to fly the electric generating system to an operating position within an air stream; and
   a second mode wherein the rotor is configured to be rotated by the air stream to provide lift to maintain the electric generating system within the air stream and to create a torque on the rotor shaft to thereby rotate the rotor shaft and the rotating structure so that the torque from the rotor is transmitted to the motor/generators via the drive shafts to generate electrical energy which is provided to the tether system.

2. The electric generating system of claim 1, comprising four power generation modules mounted to the frame.

3. The electric generating system of claim 1, wherein the air stream comprises a jet stream.

4. The electric generating system of claim 1, wherein the air stream is at an elevation of at least 6,000 feet above sea level.

5. The electric generating system of claim 1, wherein each of the motor/generators has an operating voltage in a range from 100 to 1,000 volts.

6. The electric generating system of claim 1, wherein the plurality of motor/generators are interconnected such that the electrical energy provided to the tether system in the second mode is at a voltage of at least 15,000 volts.

7. The electric generating system of claim 1, wherein each of the motor/generators of the plurality of motor/generators is in a range from 1 horsepower to 100 horsepower.

8. The electric generating system of claim 1, wherein the plurality of motor/generators comprises from 15 to 500 motor/generators which together generate between 60 kilowatts and five megawatts of electrical energy when operating in the second mode.

9. The electric generating system of claim 1, wherein the motor/generators convert to/from high power, low revolutions per minute (RPM), high-torque devices and high power, high RPM, low-torque devices based on whether the motor/generators are operating in the first mode or the second mode.

10. The electric generating system of claim 1, wherein the plurality of motor/generators comprises at least 20 canister-type motor/generators.

11. The electric generating system of claim 1, wherein the plurality of motor/generators comprises at least 10 pancake-type motor/generators.

12. A method operating an electric generating system comprising:
providing electrical energy to a plurality of motor/generators mounted to a holding structure to drive shafts of the motor/generators to create a torque on a rotor shaft to thereby rotate the rotor shaft relative to the holding structure and to rotate a rotor coupled to the rotator shaft to thereby create lift to fly the electric generating system to an operating position within an air stream;
ceasing the providing of electrical energy to the motors/generators upon the electric generating system reaching the operating position; and
rotating the rotor with the air stream to provide lift to maintain the electric generating system within the air stream and to create a torque on the rotor shaft to thereby rotate the rotor shaft so that the torque from the rotor is transmitted to the motor/generators via the drive shafts to generate electrical energy.

13. The method of claim 12, including:
ceasing the generation of electrical energy by the motor/generators; and
providing electrical energy to the motor/generators to drive the drive shafts of the motor/generators to create a torque on the rotor shaft to thereby rotate the rotor shaft relative to the holding structure and to rotate the rotor coupled to the rotor shaft to thereby create lift to fly the electric generating system to Earth from the operating position within the air stream.

14. The method of claim 12, including providing electrical energy to the motor/generators and receiving generated electrical energy from the motor/generators with a tether system.

15. The method of claim 13, including transferring the generated electrical energy to a ground station via the tether system.

16. The method of claim 12, including generating electrical energy with each of the motor/generators in a voltage range from 100 to 1,000 volts.

17. The method of claim 16, including interconnecting the motor/generators when operating in the second mode of operation so that the motor/generators together generate electrical energy having a voltage of at least 15,000 volts.

18. The method of claim 12, wherein the air stream comprises a jet stream.

19. The method of claim 12, including rotating the drive shafts of the motor/generators at a rate in a range from 40 to 500 times faster than a rate at which the air stream rotates the rotor shaft via the rotor.

20. The method of claim 11, including converting the motor/generators to/from high power, low revolutions per minute (RPM), high-torque devices and high power, high RPM, low-torque devices based on whether the motor/generators are receiving or providing electrical energy.

* * * * *